US012317032B2

(12) United States Patent
Mao et al.

(10) Patent No.: US 12,317,032 B2
(45) Date of Patent: May 27, 2025

(54) MULTIFUNCTIONAL SOUNDING DEVICE

(71) Applicant: AAC Technologies (Nanjing) Co., Ltd., Nanjing (CN)

(72) Inventors: Lubin Mao, Nanjing (CN); Ziang Li, Nanjing (CN); Yun Tang, Nanjing (CN); Jie Ma, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 135 days.

(21) Appl. No.: 18/321,725

(22) Filed: May 22, 2023

(65) Prior Publication Data

US 2024/0080628 A1 Mar. 7, 2024

Related U.S. Application Data

(63) Continuation of application No. PCT/CN2022/120235, filed on Sep. 21, 2022.

(30) Foreign Application Priority Data

Sep. 6, 2022 (CN) ........................ 202211085076.X

(51) Int. Cl.
*H04R 11/02* (2006.01)

(52) U.S. Cl.
CPC .......... *H04R 11/02* (2013.01); *H04R 2400/03* (2013.01); *H04R 2400/11* (2013.01)

(58) Field of Classification Search
CPC .. H04R 11/02; H04R 2400/03; H04R 2400/11
See application file for complete search history.

(56) References Cited

U.S. PATENT DOCUMENTS

2023/0100237 A1* 3/2023 Xiao ........................ B06B 1/045
381/412

* cited by examiner

*Primary Examiner* — Sunita Joshi
(74) *Attorney, Agent, or Firm* — Wiersch Law Group

(57) ABSTRACT

The invention provides a multifunctional sounding device, which includes a housing with a containment space and a sounding unit suspended in the containment space. The sounding unit includes a frame, a vibration system and a magnetic circuit system. The magnetic circuit system includes a main magnet and a secondary magnet. The multifunctional sounding device further includes a coil. The sounding unit of the present invention is a motor vibrator, the coil is a motor stator, and the magnetic circuit system can drive the vibration system to vibrate to realize the sound production function of the speaker. This allows the to motor and the speaker to share a set of the magnetic circuit system, which is easy to assemble, lower in cost, and saves space for the whole device.

9 Claims, 8 Drawing Sheets

A-A

A-A

B-B

MULTIFUNCTIONAL SOUNDING DEVICE

TECHNICAL FIELD

The present invention relates to electro-acoustic transducers, in particular to a multifunctional sounding device.

BACKGROUND ART

Electronic devices typically interact with users through sound playback and/or vibration sensations.

In the related art, the speaker and the motor are used for sound playback and vibration of the electronic device, respectively, and the speaker and the motor are independent devices, which complicates the overall assembly of the electronic device and occupies more internal space of the electronic device.

Therefore, it is necessary to provide a new kind of the multifunctional sounding device.

SUMMARY OF THE INVENTION

The purpose of the present invention is to provide a multifunctional sounding device, which can at least solve the deficiencies in the related art to a certain extent.

For achieving the object mentioned above, the present invention provides a multifunctional sounding device, comprising:

- a housing with a containment space;
- a sounding unit suspended in the containment space, including a frame, a vibration system fixed in the frame, and a magnetic circuit system for driving the vibration system to vibrate and generate sound along a first direction; wherein
- the magnetic circuit system with an accommodation space, includes a main magnet assembly fixed in the frame for driving the sounding unit to vibrate in a second direction which is perpendicular to the first direction, and an accommodation cavity, and a secondary magnet disposed around the main magnet assembly for forming a magnetic gap; and wherein
- the multifunctional sounding device further includes a coil fixed to the housing and located in the accommodation cavity.

Further, the magnetic circuit system further comprises a first pole plate provided with an avoidance through groove disposed opposite to the accommodation cavity; the first pole plate and the vibration system are respectively located on opposite sides of the frame; the main magnet assembly is fixedly connected to the first pole plate and the vibration system respectively; the secondary magnet is fixed to the first pole plate.

Further, the main magnet assembly comprises a first magnetic ring fixed on the first pole plate, a second pole plate fixedly connected to the first magnetic ring, a second magnetic ring fixedly connected to the second pole plate, and a magnetic yoke fixedly connected to the second magnetic ring and the vibration system respectively; the second pole plate is arranged in a ring shape, and the first magnetic ring, the second pole plate, and an inner cavity of the second magnetic ring together form the accommodation cavity.

Further, the multifunctional sounding device further comprises an iron core fixed to the housing and located in the accommodation cavity, wherein the coil is sleeved and fixed on the outside of the iron core; a magnetizing direction of the first magnetic ring is directed towards the first pole plate; magnetizing directions of the second magnetic ring and the secondary magnet are both directed towards the vibration system; magnetizing directions of both ends of the magnetic yoke are directed towards the vibration system; and a magnetizing direction of the central region of the magnetic yoke is directed towards the first pole plate.

Further, the main magnet assembly further comprises a magnetic body accommodated in the accommodation cavity and both ends of which are respectively fixed inside the first magnetic ring; the coil is sleeved on the outer side of the magnetic body; the magnetic body is magnetized from both ends toward the middle; the magnetizing direction of the first magnetic ring is directed towards the first pole plate; the magnetizing directions of the second magnetic ring, the magnetic yoke and the secondary magnet are all directed towards the vibration system.

Further, the main magnet assembly comprises a first magnetic ring fixed on the first pole plate, and a magnetic yoke, which is fixedly connected to the vibration system and the first magnetic ring respectively, and two of second pole plates accommodated in the accommodation cavity and fixed to the first pole plate; and two of the second pole plates extend in a direction toward the vibration system along an edge of the avoidance through groove.

Further, the multifunctional sounding device further comprising an iron core fixed to the housing and located in the accommodation cavity; the coil is sleeved and fixed on the outside of the iron core; magnetization directions of the first magnetic ring on opposite sides of the coil axis are arranged opposite to each other; a magnetizing direction of one side of the secondary magnet on the opposite sides of the coil axis is toward the first pole plate, and the other side is toward the vibration system.

Further, the frame comprises a main frame that is elastically connected to the housing, a surrounding frame fixedly connected to the side of the main frame away from the housing, and an upper cover fixed to the side of the surrounding frame away from the main frame; the first pole plate is fixed to the main frame; and the vibration system is connected with the upper cover.

Further, the surrounding frame has a gap; the multifunctional sounding device further comprises an elastic member which is fixedly connected to the main frame and the housing respectively and is located in the gap.

Further, the vibration system comprises a diaphragm fixedly connected to the frame and the main magnet assembly respectively; a sealing ring is connected between the diaphragm and the main magnet assembly; the sounding unit further includes a voice coil connected to the diaphragm and located within the magnetic gap.

The beneficial effects of the present invention are: Since the sounding unit is the motor vibrator, the coil is the motor stator, and the magnetic circuit system can drive the vibration system to vibrate in the first direction to produce sound, the voice function of the speaker is realized, so that the motor and the speaker share a set of the magnetic circuit system, the assembly is simple, the cost is lower, and the space of the whole machine is saved.

DETAILED DESCRIPTION OF EXEMPLARY EMBODIMENT

Figure 1:
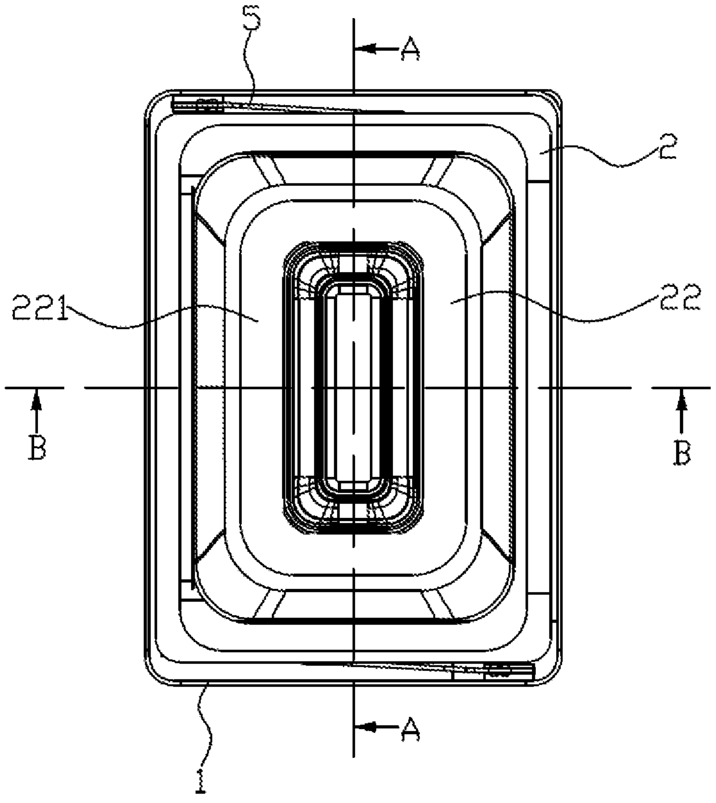
FIG. 1 is a top view of a multifunctional sounding device in accordance with an embodiment of the present invention.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Referring to FIGS. 1-8, an embodiment of the present invention provides the multifunctional sounding device, including a housing 1 having a containment space 11 and a sounding unit 2 suspended in the containment space 11. The sounding unit 2 includes a frame 21, a vibration system 22 fixed in the frame 21, and a magnetic circuit system 23 that drives the vibration system 22 to vibrate and sound in a first direction. The magnetic circuit system 23 includes a main magnet assembly 231 fixed in the frame 21 and having an accommodation cavity 2315, and a secondary magnet 232 disposed around the main magnet assembly 231 to form the magnetic gap. The multifunctional sounding device also includes a coil 3 fixed to the housing 1 and located within the accommodation cavity 2315. Driven by the coil 3, the main magnet assembly 231 can drive the sounding unit 2 to vibrate in a second direction, and the second direction is perpendicular to the first direction.

It should be understood that when the main magnet assembly 231 in the magnetic circuit system 23 drives the sounding unit 2 to vibrate in the second direction under the driving of the coil 3, the sounding unit 2 is the motor vibrator, the coil 3 is the motor stator, and the magnetic circuit system 23 can drive the vibration system 22 to vibrate and produce sound in the first direction. The voice function of the speaker is realized, so that the motor and the speaker share a set of the magnetic circuit system 23. The assembly is simple, the cost is lower, and the space of the whole machine is saved.

Please refer to FIGS. 1-5. Further, the magnetic circuit system 23 further includes a first pole plate 233 fixed in the frame 21. The first pole plate 233 is provided with an avoidance through groove 2331 disposed opposite the accommodation cavity 2315. The first pole plate 233 and the vibration system 22 are located on opposite sides of the frame 21, respectively. The main magnet assembly 231 is fixedly connected to the first pole plate 233 and the vibration system 22, respectively. The secondary magnet 232 is fixed to the first pole plate 233. Specifically, the first pole plate 233 can be a flat plate, one side board of the first pole plate 233 is in contact with the housing 1, the other side board is fixed with the main magnet assembly 231 and the secondary magnet 232, and the first pole plate 233 is provided with an avoidance through groove 2331 arranged opposite the accommodation cavity 2315. Such setting ensures that the first pole plate 233 will not interfere with the fixation between the coil 3 and the housing 1. Meanwhile, the collision of the first pole plate 233 with the coil 3 can be avoided when the sounding unit 2 moves in the second direction.

In this embodiment of the present invention, the first direction may be the Z direction, and the second direction may be the X direction; the main magnet assembly 231 and the secondary magnet 232 can be magnetized in various ways, so that the magnetic field strength generated by the magnetic circuit system 23 is different. Therefore, different magnitudes of driving force can be generated, which facilitates adjustment of the vibration effect of the vibration system 22 along the first direction and the vibration effect of the sounding unit 2 along the second direction.

Figure 2:
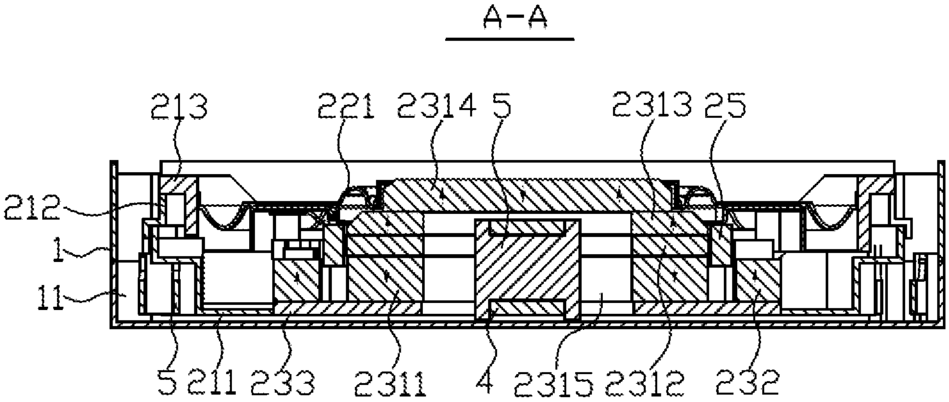
FIG. 2 is a cross-sectional view of a main magnet assembly of the multifunctional sounding device in FIG. 1 taken along line A-A, illustrating a first magnetic ring, a second pole plate, a second magnetic ring and a magnetic yoke.
Figure 3:
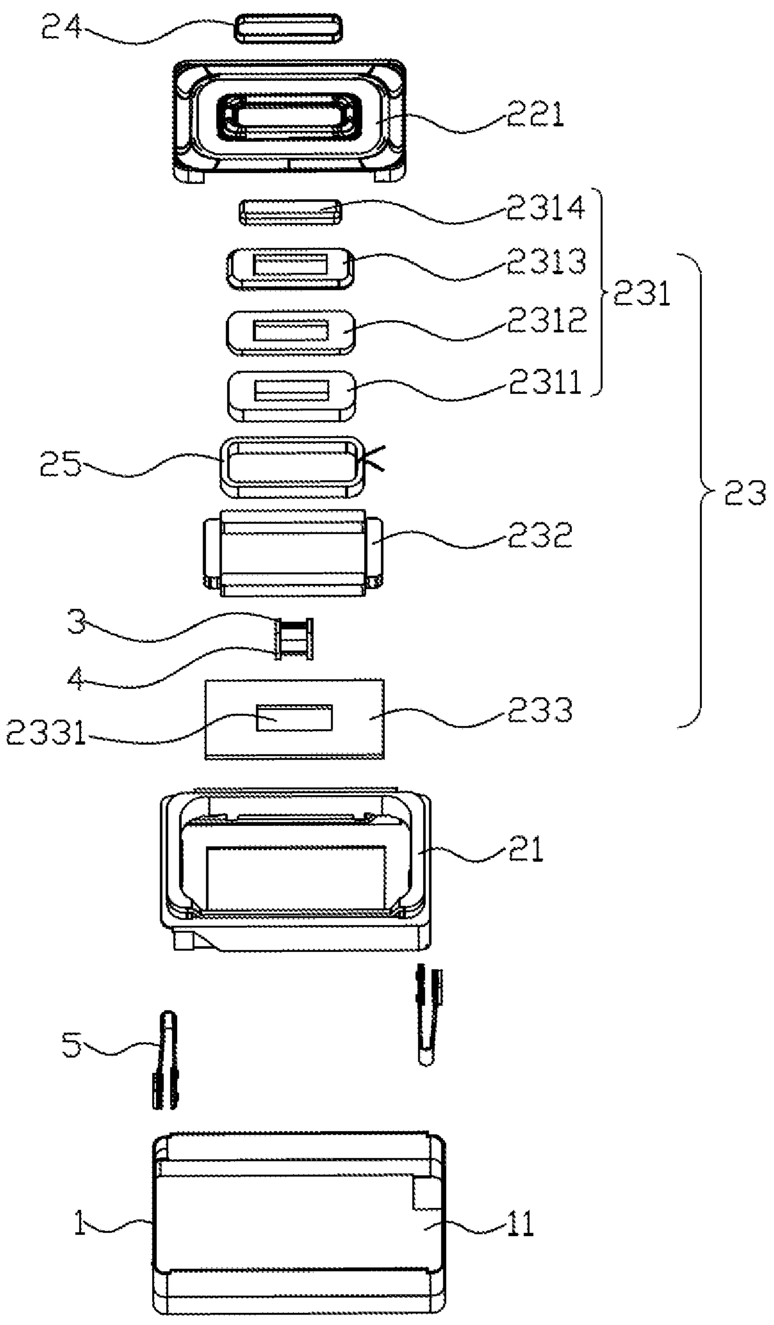
FIG. 3 is an exploded view of the main magnet assembly.

Please refer to FIGS. 1-3. In some embodiments, the main magnet assembly 231 includes a first magnetic ring 2311 fixed to the first pole plate 233, and a second pole plate 2312 fixedly connected to the first magnetic ring 2311, and a second magnetic ring 2313 fixedly connected to the second pole plate 2312, and a magnetic yoke 2314 which is fixedly connected to the second magnetic ring 2313 and the vibration system 22 respectively. The second pole plate 2312 is arranged in a ring shape, the first magnetic ring 2311, the second pole plate 2312, and the inner cavity of the second magnetic ring 2313 together form the accommodation cavity 2315. Specifically, the height of the first magnetic ring 2311 is equal to the height of the secondary magnet 232, that is, the magnetic gap is set between the first magnetic ring 2311 and the secondary magnet 232. The thickness of the first magnetic ring 2311 is greater than that of the second magnetic ring 2313, and the thickness of the second magnetic ring 2313 is smaller than that of the magnetic yoke 2314. It is beneficial to reduce the materials consumed in the manufacture of the main magnet assembly 231, thereby reducing the cost. The magnetic yoke 2314 covers and seals the inner cavity of the second magnetic ring 2313 to ensure the sealing of the sounding unit 2, thereby enhancing the sounding effect of the sounding unit 2. According to actual needs, the cross-sectional size of the inner cavity of the first magnetic ring 2311, the inner cavity of the second pole plate 2312, and the inner cavity of the second magnetic ring 2313 are the same, which is beneficial to ensure the main magnet assembly 231 is set symmetrically.

Please refer to FIGS. 2-3 (the direction of the arrow in FIG. 2 is the magnetizing direction). In one embodiment, the multifunctional sounding device further includes an iron core 4 fixed to the housing 1 and located in the accommodation cavity 2315. The coil 3 is sleeved and fixed on the outside of the iron core 4. The magnetizing direction of the first magnetic ring 2311 is toward the first pole plate 233. Both the magnetizing directions of the second magnetic ring 2313 and the secondary magnet 232 are toward the vibration system 22. The magnetizing directions of both ends of the magnetic yoke 2314 are towards the vibration system 22. The magnetizing direction of the central region of the magnetic yoke 2314 is towards the first pole plate 233. Specifically, one end of the iron core 4 passes through the avoidance through groove 2331 of the first pole plate 233 and is fixed to the housing 1, and the other end extends into the accommodation cavity 2315. The axis extension direction is parallel to the length extension direction of the magnetic yoke 2314. It is beneficial for the coil 3 to provide a driving force for driving the sounding unit 2 to move in the second direction. It should be understood that in this embodiment, the iron core 4 and the coil 3 together act as the motor stator.

Figure 4:
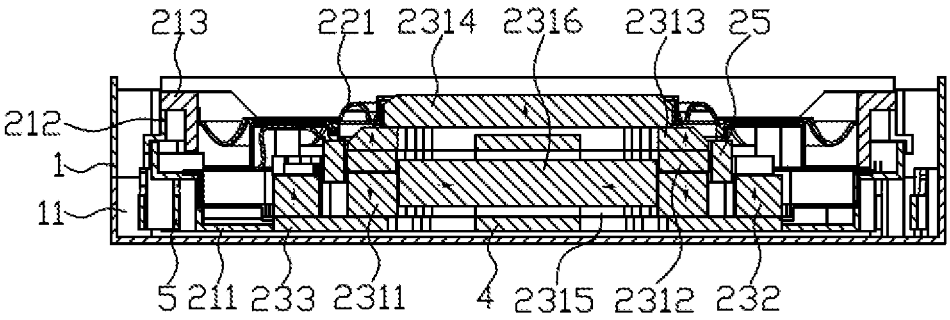
FIG. 4 is a cross-sectional view of the main magnet assembly illustrating the first magnetic ring, the second pole plate, the second magnetic ring, the magnetic yoke, and the magnetic body.
Figure 5:
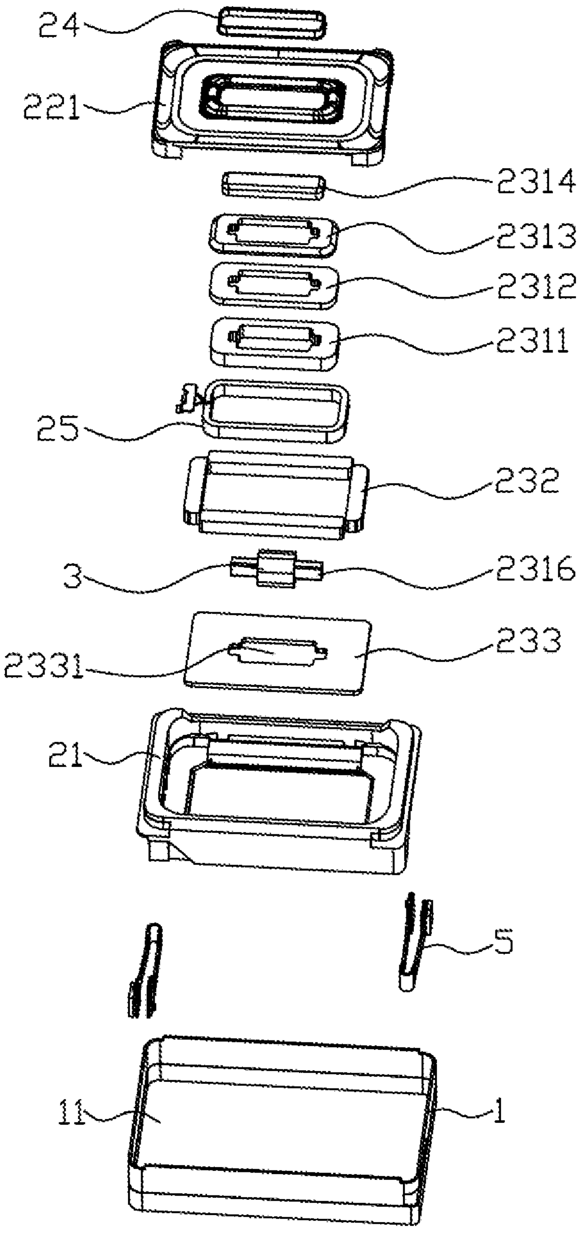
FIG. 5 is an exploded view of the main magnet assembly, illustrating the first magnetic ring, the second pole plate, the second magnetic ring, the magnetic yoke, and the magnetic body.

Please refer to FIGS. 4-5 (the direction of the arrow in FIG. 4 is the magnetizing direction), in one embodiment, the main magnet assembly 231 further includes a magnetic body 2316 accommodated in the accommodation cavity 2315 and fixed to the inner side of the first magnetic ring 2311 at both ends. The coil 3 is sleeved on the outer side of the magnetic body 2316. The magnetic body 2316 is magnetized from both ends toward the middle. The magnetizing direction of the first magnetic ring 2311 is toward the first pole plate 233. The magnetizing directions of the second magnetic ring 2313, the magnetic yoke 2314 and the secondary magnet 232 are all facing the vibration system 22. Specifically, the magnetic body 2316 can be in the shape of a column, and the magnetic body 2316 is opposite to the magnet at the same level. One side of the coil 3 passes through the avoidance through groove 2331 of the first pole plate 233 and is in contact with the housing 1. At this time, the coil 3 and the housing 1 can be fixed by gluing. It should be understood that in this embodiment, only the coil 3 is used as the stator of the motor.

Figure 6:
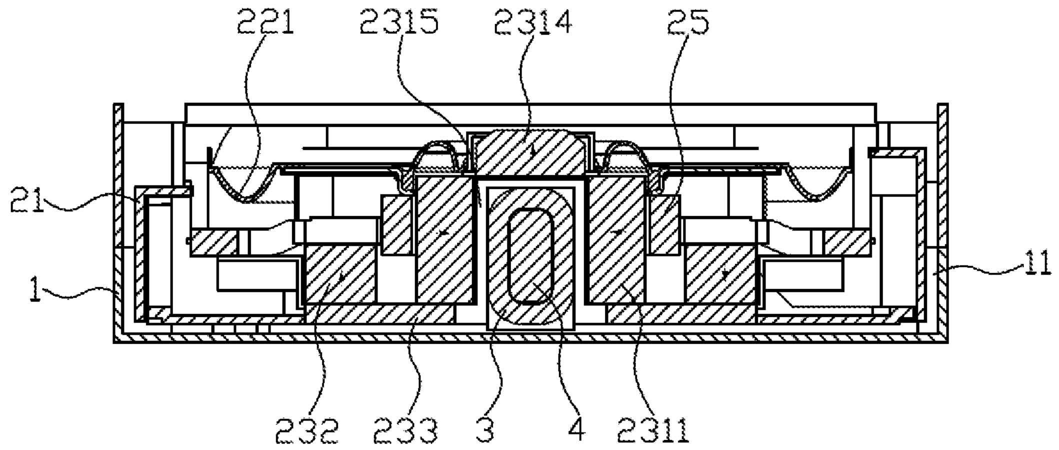
FIG. 6 is a cross-sectional view of the main magnet assembly in FIG. 1 taken along line B-B, illustrating the first magnetic ring, a second pole plate, and the magnetic yoke.
Figure 7:
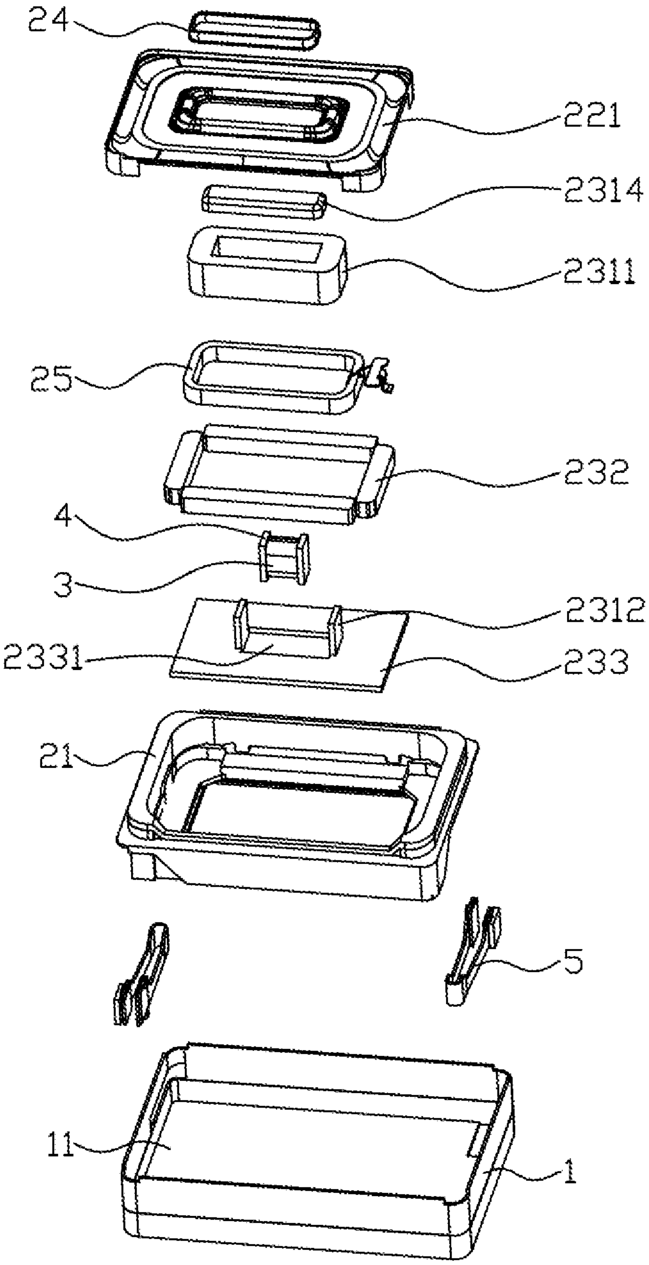
FIG. 7 is an exploded view of the main magnet assembly, illustrating the first magnetic ring, the second pole plate, and the magnetic yoke.

Please refer to FIGS. 1, and 6-7. In one embodiment, the main magnet assembly 231 includes a first magnetic ring 2311 fixed to the first pole plate 233, and a magnetic yoke 2314, which is fixedly connected to the vibration system 22 and the first magnetic ring 2311 respectively, and two second pole plates 2312 housed in the accommodation cavity 2315 and fixed to the first pole plate 233. The inner cavity of the first magnetic ring 2311 forms an accommodation cavity 2315. The two second pole plates 2312 are distributed at opposite ends of the first magnetic ring 2311, and the second pole plates 2312 are located in the extending direction of the axis of the coil 3. Specifically, a magnetic gap is formed between the first magnetic ring 2311 and the secondary magnet 232. The height of the first magnetic ring 2311 is higher than that of the secondary magnet 232, and the thickness of the first magnetic ring 2311 is greater than that of the magnetic yoke 2314. Compared with other embodiments in which the main magnet assembly 231 is provided with multiple the magnetic rings and multiple the pole plates, the main magnet assembly 231 in this embodiment is only provided with a magnetic ring, which simplifies the assembly process of the main magnet assembly 231 and reduces the manufacturing cost of the main magnet assembly 231. The magnetic yoke 2314 covers and seals the inner cavity of the first magnetic ring 2311 to ensure the sealing of the sounding unit 2, thereby enhancing the sounding effect of the sounding unit 2.

Please refer to FIGS. 6-7 (the direction of the arrow in FIG. 6 is the magnetizing direction). Further, the multifunctional sounding device also includes an iron core 4 fixed to the housing 1 and located in the accommodation cavity 2315. The coil 3 is sleeved and fixed on the outside of the iron core 4. The magnetization directions of the first magnetic ring 2311 on opposite sides of the axis of the coil 3 are oppositely arranged. The magnetizing direction of the secondary magnet 232 on the opposite sides of the axis of the coil 3 is toward the first pole plate 233 and the other side is toward the vibration system 22. It should be understood that the arrangement manner of the iron core 4 and the coil 3 in this embodiment is the same as the arrangement manner of the iron core 4 and the coil 3 in the foregoing embodiments, and will not be discussed here.

Figure 8:
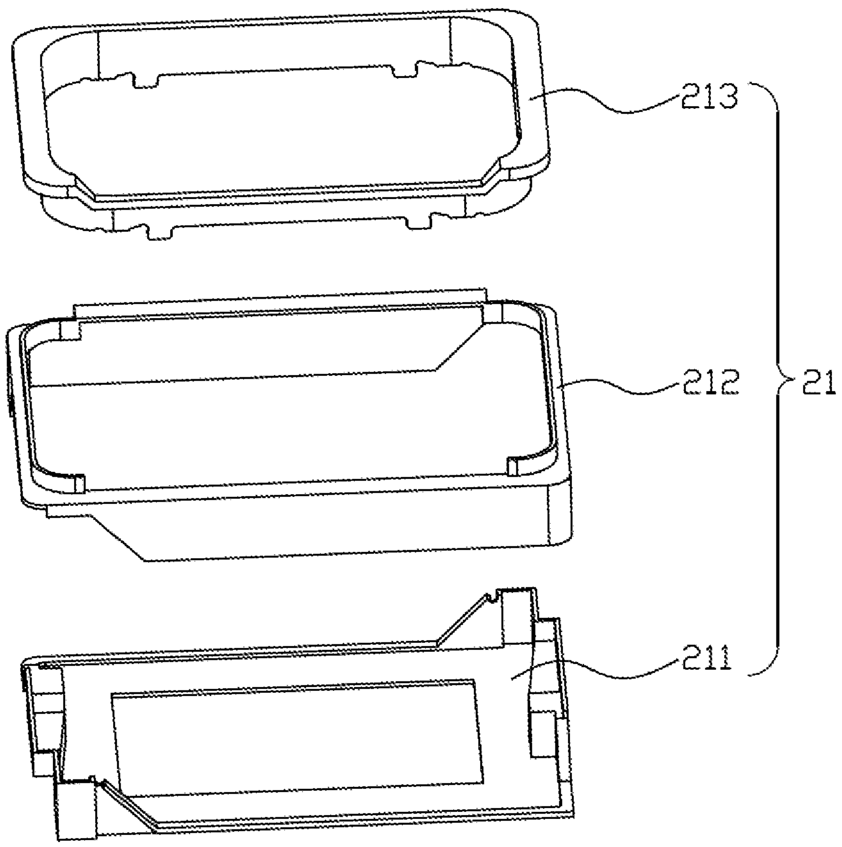
FIG. 8 is an exploded view of a frame of the multifunctional sounding device.

Please refer to FIGS. 2 and 8, in one embodiment, the frame 21 includes a main frame 211 elastically connected to the housing 1, and a surrounding frame 212 fixedly connected to one side of the main frame 211 away from the housing 1, and an upper cover 213 fixed to one side of the surrounding frame 212 away from the main frame 211. The first pole plate 233 is fixed to the main frame 211, and the vibration system 22 is connected to the upper cover 213. Specifically, the main frame 211 is provided with an installation through groove, the first pole plate 233 is fixed in the installation through groove, and the surrounding frame 212 is used to enclose and seal the main frame 211. The sealed space is formed between the vibration system 22, the main magnet assembly 231 and the frame 21, which is beneficial to improve the sounding effect of the sounding unit 2. Both ends of the main frame 211 are elastically connected to the housing 1 respectively, so that the sounding unit 2 can vibrate back and forth in the second direction.

Please refer to FIGS. 2 and 8, further, the surrounding frame 212 is provided with gaps. The multifunctional sounding device also includes two the elastic members 5 which are respectively fixedly connected to the main frame 211 and the housing 1 and located in the gap. Specifically, the surrounding frame 212 is provided with two of the gaps. Two of the elastic members 5 are arranged, and the two elastic members 5 are arranged in the extension direction of the axis of the coil 3. The gap of the surrounding frame 212 can provide sufficient elastic deformation space of the elastic member 5, thereby enhancing the vibration intensity of the sounding unit 2 along the second direction.

Please refer to FIGS. 2, 4 and 6, where the elastic member 5 is U-shaped. The elastic member 5 includes a first connection arm fixedly connected to the main frame 211, a second connection arm fixedly connected to the housing 1, and an elastic part fixedly connected to the first connection arm and the second connection arm respectively. There is a gap between the first connection arm and the second connection arm. When the main magnet assembly 231 drives the sounding unit 2 to move in the second direction, the first connection arm moves toward the direction close to the second connection arm, and at this time, the gap between the first connection arm and the first connection arm becomes smaller. When the elastic member 5 drives the sounding unit 2 to restore, the first connection arm moves in a direction away from the second connection arm, and at this time, the gap between the first connection arm and the second connection arm becomes larger. Preferably, the gasket is fixed on the opposite sides of the first connection arm and the second connection arm, the gasket can buffer the collision between the first connection arm and the second connection arm, which prevents the elastic member 5 from being damaged due to the collision between the first connection arm and the second connection arm. According to actual needs, the elastic member 5 can also be V-type and compression spring type, and the gasket can be made of foam, rubber, silicone elastic materials.

Please refer to FIGS. 1-3. In one embodiment, the vibration system 22 includes a diaphragm 221 fixedly connected to the frame 21 and the main magnet assembly 231, respectively, and the sealing ring 24 is connected between the diaphragm 221 and the main magnet assembly 231. The sounding unit 2 also includes a voice coil 25 connected to the diaphragm 221 and located within the magnetic gap. The voice coil 25 is used to drive the diaphragm 221 to vibrate in the first direction. Specifically, the diaphragm 221 includes an outer folded ring fixedly connected to the upper cover 213, and a dome connected to the outer folded ring, and an inner folded rind connected to the dome and the magnetic yoke 2314 respectively. The voice coil 25 is connected to the dome, the sealing ring 24 is arranged between the inner folded rind and the magnetic yoke 2314, which ensures a sealed connection between the diaphragm 221 and the main magnet assembly 231. When the magnetic circuit system 23 drives the voice coil 25 to vibrate, the voice coil 25 drives the dome, the inner folded ring and the outer folded ring to vibrate, so that the diaphragm 221 vibrates to produce sound.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A multifunctional sounding device, comprising:

a housing with a containment space;

a sounding unit suspended in the containment space, including a frame, a vibration system fixed in the frame, and a magnetic circuit system for driving the vibration system to vibrate and generate sound along a first direction; wherein the magnetic circuit system with an accommodation space, includes a main magnet assembly fixed in the frame for driving the sounding unit to vibrate in a second direction which is perpendicular to the first direction, and an accommodation cavity, and a secondary magnet disposed around the main magnet assembly for forming a magnetic gap; and wherein the multifunctional sounding device further includes a coil fixed to the housing and located in the accommodation cavity;

wherein, the magnetic circuit system further comprises a first pole plate provided with an avoidance through groove disposed opposite to the accommodation cavity; the first pole plate and the vibration system are respectively located on opposite sides of the frame; the main magnet assembly is fixedly connected to the first pole plate and the vibration system respectively; the secondary magnet is fixed to the first pole plate.

2. The multifunctional sounding device as described in claim 1, wherein, the main magnet assembly comprises a first magnetic ring fixed on the first pole plate, a second pole plate fixedly connected to the first magnetic ring, a second magnetic ring fixedly connected to the second pole plate, and a magnetic yoke fixedly connected to the second magnetic ring and the vibration system respectively; the second pole plate is arranged in a ring shape, and the first magnetic ring, the second pole plate, and an inner cavity of the second magnetic ring together form the accommodation cavity.

3. The multifunctional sounding device as described in claim 2, further comprising an iron core fixed to the housing and located in the accommodation cavity, wherein the coil is sleeved and fixed on the outside of the iron core; a magnetizing direction of the first magnetic ring is directed towards the first pole plate; magnetizing directions of the second magnetic ring and the secondary magnet are both directed towards the vibration system; magnetizing directions of both ends of the magnetic yoke are directed towards the vibration system; and a magnetizing direction of the central region of the magnetic yoke is directed towards the first pole plate.

4. The multifunctional sounding device as described in claim 2, wherein, the main magnet assembly further comprises a magnetic body accommodated in the accommodation cavity and both ends of which are respectively fixed inside the first magnetic ring; the coil is sleeved on the outer side of the magnetic body; the magnetic body is magnetized from both ends toward the middle; the magnetizing direction of the first magnetic ring is directed towards the first pole plate; the magnetizing directions of the second magnetic ring, the magnetic yoke and the secondary magnet are all directed towards the vibration system.

5. The multifunctional sounding device as described in claim 1, wherein, the main magnet assembly comprises a first magnetic ring fixed on the first pole plate, and a magnetic yoke, which is fixedly connected to the vibration system and the first magnetic ring respectively, and two of second pole plates accommodated in the accommodation cavity and fixed to the first pole plate; and two of the second pole plates extend in a direction toward the vibration system along an edge of the avoidance through groove.

6. The multifunctional sounding device as described in claim 5, further comprising an iron core fixed to the housing and located in the accommodation cavity; the coil is sleeved and fixed on the outside of the iron core; magnetization directions of the first magnetic ring on opposite sides of the coil axis are arranged opposite to each other; a magnetizing direction of one side of the secondary magnet on the opposite sides of the coil axis is toward the first pole plate, and the other side is toward the vibration system.

7. The multifunctional sounding device as described in claim 1, wherein, the frame comprises a main frame that is elastically connected to the housing, a surrounding frame fixedly connected to the side of the main frame away from the housing, and an upper cover fixed to the side of the surrounding frame away from the main frame; the first pole plate is fixed to the main frame; and the vibration system is connected with the upper cover.

8. The multifunctional sounding device as described in claim 7, wherein, the surrounding frame has a gap; the multifunctional sounding device further comprises an elastic member which is fixedly connected to the main frame and the housing respectively and is located in the gap.

9. The multifunctional sounding device as described in claim 1, wherein, the vibration system comprises a diaphragm fixedly connected to the frame and the main magnet assembly respectively; a sealing ring is connected between the diaphragm and the main magnet assembly; the sounding unit further includes a voice coil connected to the diaphragm and located within the magnetic gap.

* * * * *